United States Patent
Lin et al.

(10) Patent No.: US 10,374,742 B2
(45) Date of Patent: Aug. 6, 2019

(54) BIDIRECTIONAL OPTICAL COMMUNICATION WITH MINIMAL GUARD BAND

(71) Applicant: Finisar Corporation, Sunnyvale, CA (US)

(72) Inventors: Leo Yu-Yu Lin, Shanghai (CN); Huiping Li, Shanghai (CN); Youbin Zheng, Shanghai (CN); Huade Shu, Shanghai (CN); Li Zhang, Shanghai (CN)

(73) Assignee: FINISAR CORPORATION, Sunnyvale, CA (US)

( * ) Notice: Subject to any disclaimer, the term of this patent is extended or adjusted under 35 U.S.C. 154(b) by 0 days.

(21) Appl. No.: 15/433,904

(22) Filed: Feb. 15, 2017

(65) Prior Publication Data

US 2018/0234198 A1    Aug. 16, 2018

(51) Int. Cl.
*H04B 10/40* (2013.01)
*H04J 14/02* (2006.01)

(52) U.S. Cl.
CPC .......... *H04J 14/0224* (2013.01); *H04B 10/40* (2013.01)

(58) Field of Classification Search
CPC .... H04B 10/2503; H04B 10/50; H04B 10/60; H04B 10/572; H04B 10/66; H04J 14/021; H04J 14/0213; H04J 14/0216; H04J 14/2016
USPC ...................................................... 398/79–96
See application file for complete search history.

(56) References Cited

U.S. PATENT DOCUMENTS

| | | | | |
|---|---|---|---|---|
| 6,885,822 B1* | 4/2005 | Chin | ................... | H04J 14/0227 398/3 |
| 7,773,883 B1* | 8/2010 | Weng | ................... | H04J 14/0208 398/3 |
| 7,903,975 B2* | 3/2011 | Sasaki | ................ | H04J 14/0212 385/16 |
| 8,971,709 B2* | 3/2015 | Liu | ................... | H04B 10/2503 398/67 |
| 2005/0025486 A1* | 2/2005 | Zhong | ............... | H04B 10/2503 398/79 |
| 2007/0280695 A1* | 12/2007 | Li | ........................ | H04B 10/506 398/135 |
| 2008/0199182 A1* | 8/2008 | Ooi | .................... | H04B 10/2513 398/81 |
| 2010/0178057 A1* | 7/2010 | Shieh | .................. | H04L 25/0224 398/79 |
| 2012/0014692 A1* | 1/2012 | Kim | ..................... | H04J 14/0205 398/34 |
| 2012/0093502 A1* | 4/2012 | Gottwald | ............... | H04B 10/27 398/27 |
| 2012/0177362 A1* | 7/2012 | Zhang | ............... | H04B 10/0773 398/9 |
| 2012/0224181 A1* | 9/2012 | Lu | ...................... | G02B 27/4244 356/477 |

(Continued)

*Primary Examiner* — Amritbir K Sandhu
(74) *Attorney, Agent, or Firm* — Maschoff Brennan (57) ABSTRACT

A module, system and method adjusts a tunable filter to have an adjustable frequency response based on one of an outbound optical signal on a transmit channel and an inbound optical signal on a receive channel. The tunable filter is in an optical path of the outbound optical signal and in an optical path of the inbound optical signal. The transmit and the receive channels are configured as part of a channel plan of a bidirectional (bi-di) dense wavelength division multiplexing (DWDM) system.

20 Claims, 8 Drawing Sheets

(56) References Cited

U.S. PATENT DOCUMENTS

| | | | |
|---|---|---|---|
| 2012/0251120 A1* | 10/2012 | McNicol | H04B 10/506 |
| | | | 398/91 |
| 2012/0275784 A1* | 11/2012 | Soto | H04B 10/2503 |
| | | | 398/38 |
| 2013/0011138 A1* | 1/2013 | Kim | H04B 10/616 |
| | | | 398/79 |
| 2013/0209105 A1* | 8/2013 | Jeong | H04J 14/0282 |
| | | | 398/72 |
| 2015/0200743 A1* | 7/2015 | Kamalov | H04J 14/0202 |
| | | | 398/85 |
| 2015/0303892 A1* | 10/2015 | Desclos | H03H 7/1758 |
| | | | 333/132 |
| 2016/0329966 A1* | 11/2016 | Eiselt | H04J 14/0246 |
| 2017/0134114 A1* | 5/2017 | Boertjes | H04J 14/0257 |
| 2017/0279554 A1* | 9/2017 | Lin | H04B 10/2503 |
| 2018/0062825 A1* | 3/2018 | Miao | H04B 10/0795 |
| 2018/0234198 A1* | 8/2018 | Lin | H04J 14/021 |

\* cited by examiner

FIG. 8

BIDIRECTIONAL OPTICAL COMMUNICATION WITH MINIMAL GUARD BAND

FIELD

The embodiments discussed herein are related to bidirectional (bi-di) communication modules.

BACKGROUND

In a bidirectional (bi-di) dense wavelength division multiplexing (DWDM) system, two different sets of wavelength channels are used to carry upstream and downstream data traffic in opposite directions in a single fiber. One common example is to use C-band wavelengths for upstream data traffic and L-band wavelengths for downstream data traffic. A second example uses a lower half of C-band ("C–" band) wavelengths for upstream and higher half of C-band ("C+" band) wavelengths for downstream. An edge filter is needed to separate the two sets of wavelengths and a guard-band, for example of approximately 12 nm, is needed to allow the edge filter to separate the two sets of wavelengths. Accordingly, the guard-band takes up a significant portion of the available band and reduces available wavelengths channels in a single fiber.

BRIEF DESCRIPTION OF THE DRAWINGS

Example embodiments will be described and explained with additional specificity and detail through the use of the accompanying drawings.

DETAILED DESCRIPTION

Figure 1:
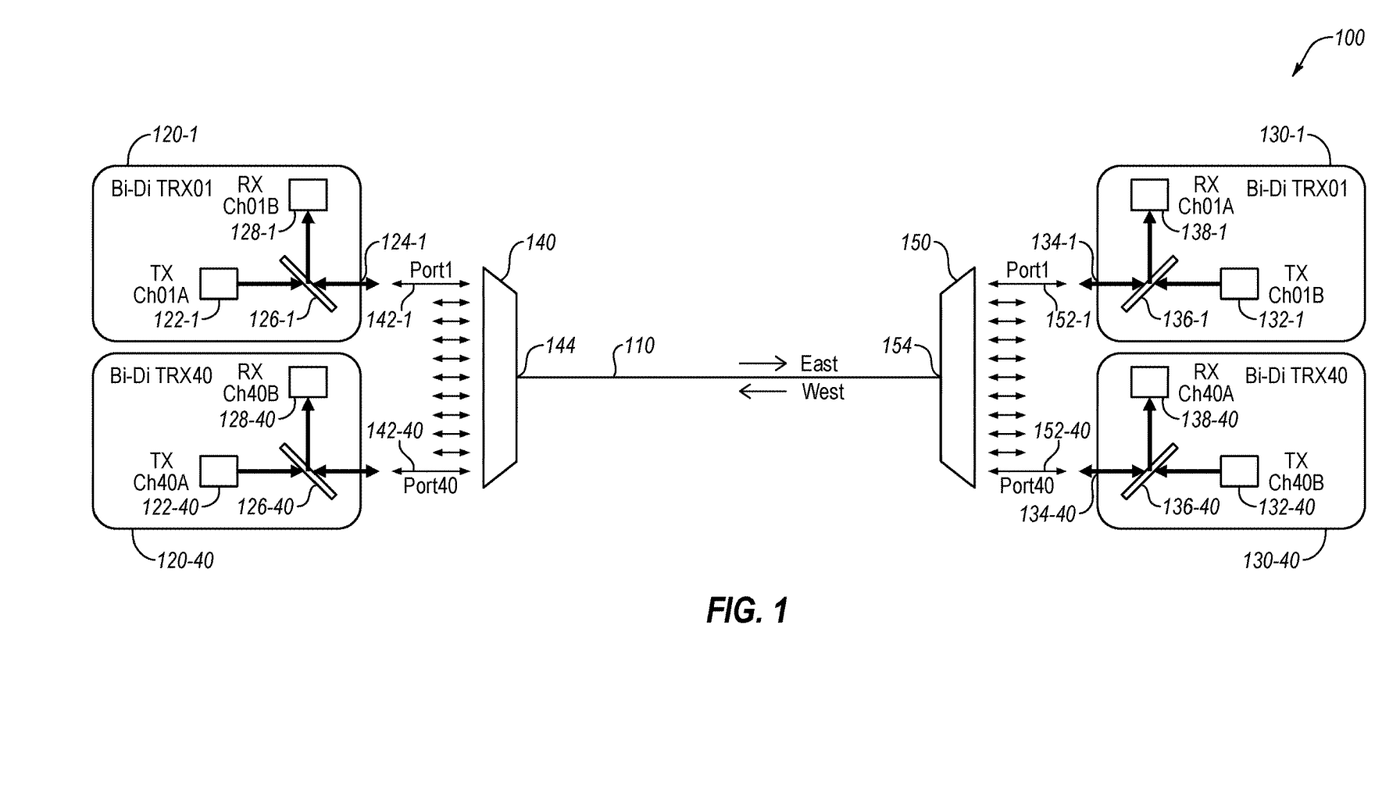
FIG. 1 illustrates an example optical communication system configured as a bidirectional (bi-di) dense wavelength division multiplexing (DWDM) system.

FIG. 1 illustrates an example optical communication system configured as a bidirectional (bi-di) dense wavelength division multiplexing (DWDM) system 100 (hereinafter "system 100") that implements wavelength division multiplexing (WDM) to communicate multiple optical signals bidirectionally across an optical fiber between multiple communication modules. In FIG. 1 and other figures herein, a direction from left to right through the optical fiber is referred to as east, while a direction from right to left through the optical fiber is referred to as west.

The system 100 may include, for example, forty communication modules at each of two ends of an optical fiber 110. At a first end, a first and last of the communication modules (e.g., communication module 120-1 and communication module 120-40) are depicted and respectively labeled "Bi-Di TRX01" and "Bi-Di TRX40". At a second end, a first and last of the communication modules (e.g., communication module 130-1 and communication module 130-40) are depicted and respectively labeled "Bi-Di TRX01" and "Bi-Di TRX40". Due to space constraints in the drawings, communication modules 2-39 are not illustrated at either end of the optical fiber 110. Each communication module includes a transmitter configured to emit an optical signal that is representative of an electrical signal received from a host device at a designated frequency (and wavelength) that is different than a designated frequency (and wavelength) of other optical signals emitted by transmitters of other communication modules in the system 100. The various designated frequencies (and corresponding wavelengths) may be referred to as channels. Each communication module additionally includes a receiver configured to receive an optical signal in a particular one of the channels.

The system 100 additionally may include, for example, a 100 gigahertz (GHz) optical multiplexer/demultiplexer (Mux/Demux) 140 at the first end of the optical fiber 110 between the optical fiber 110 and the communication modules 120. The system 100 additionally may include, for example, a 100 gigahertz (GHz) optical multiplexer/demultiplexer (Mux/Demux) 150 at the second end of the optical fiber 110 between the optical fiber 110 and the communication modules 130. Each Mux/Demux 140/150 may include, for example, forth module-side ports and a single fiber-side port. In operation, Mux/Demux 140 is configured to receive, for example, forty eastbound optical signals at the forty module-side ports from the forty communication modules 120-1 through 120-40 and to spatially combine (e.g., multiplex) the forty eastbound optical signals for output through the fiber-side port to optical fiber 110. The forty spatially combined eastbound optical signals are transmitted eastward through optical fiber 110 to Mux/Demux 150. Mux/Demux 150 is configured to receive, for example, the forty spatially combined eastbound optical signals from optical fiber 110 through the fiber-side port and to spatially separate (e.g., demultiplex) out the individual forty eastbound optical signals. The forty eastbound optical signals are output through the forty module side ports of Mux/Demux 150 such that each of the forty eastbound optical signals is provided to a different one of the forty communication modules 130-1 through 130-40.

Analogously, Mux/Demux 150 is configured to receive forty westbound optical signals on the forty module-side ports from the forty communication modules 130-1 through 130-40 and to spatially combine (e.g., multiplex) the forty westbound optical signals for output through the fiber-side port to the optical fiber 110. The forty spatially combined westbound optical signals are transmitted westward through optical fiber 110 to Mux/Demux 140. Mux/Demux 140 is configured to receive the forty spatially combined westbound optical signals from optical fiber 110 through the fiber-side port and to spatially separate (e.g., demultiplex) out the individual forty westbound optical signals. The forty westbound optical signals are output through the forty module-side ports of Mux/Demux 140 such that each of the forty westbound optical signals is provided to a different one of the forty communication modules 120-1 through 120-40.

Figure 2:
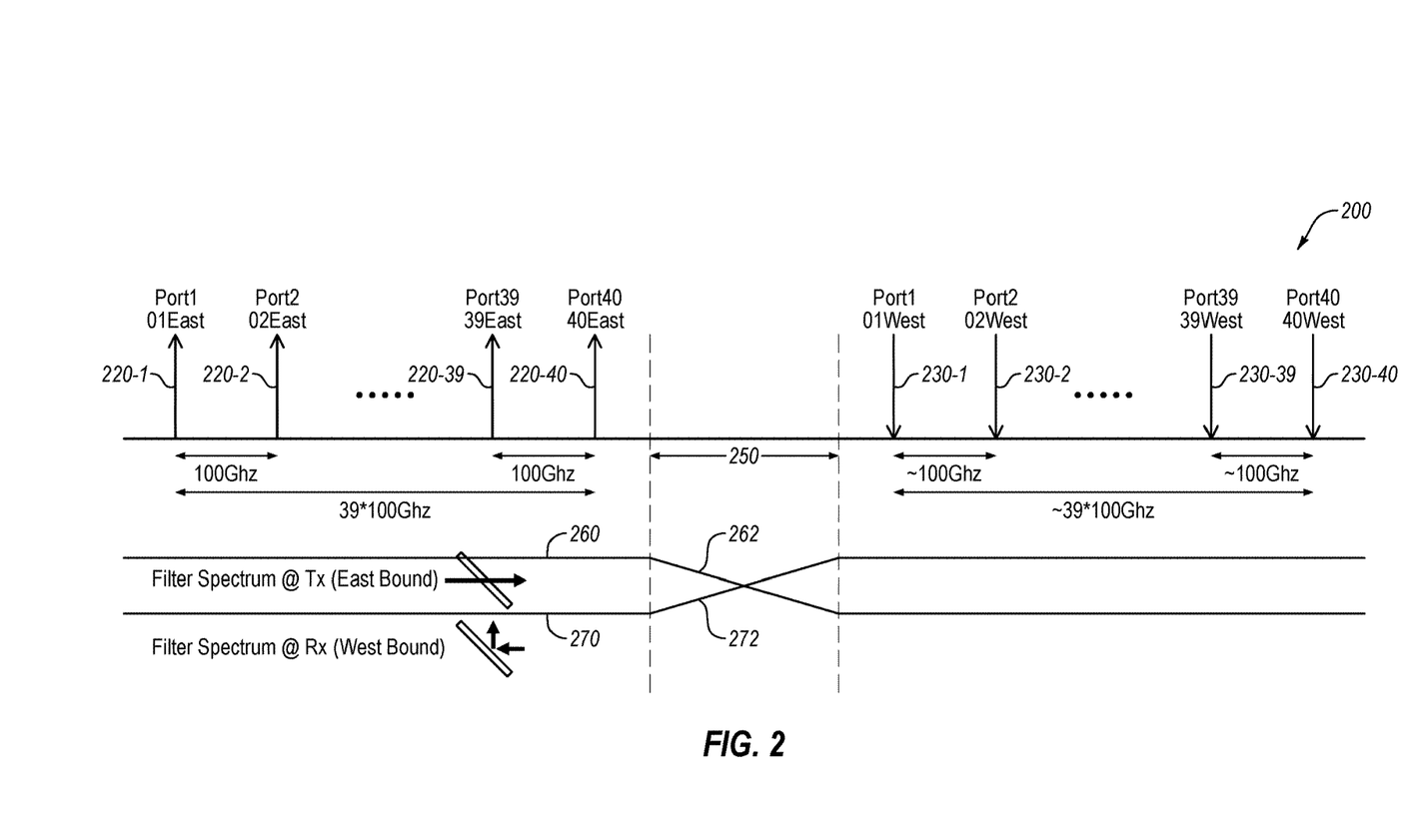
FIG. 2 illustrates a channel plan of a bidirectional (bi-di) dense wavelength division multiplexing (DWDM) system.

FIG. 2 illustrates a channel plan 200 of a bidirectional (bi-di) dense wavelength division multiplexing (DWDM) system 100 of Mux/Demux 140/150 along with port and channel assignments for system 100. Each eastbound channel is assigned to a different port of each Mux/Demux 140/150 and exhibits a different transmission peak in the channel plan 200 than other eastbound channels. For instance, eastbound channels 220-1 through 220-40 are respectively assigned to ports 142-1 through 142-40 and to different transmission peaks of the channel plan 200 where the transmission peaks, for example, have a center-to-center spacing of 100 GHz. Similarly, westbound channels 230-1 through 230-40 are respectively assigned to ports 152-1 through 152-40 and to different transmission peaks of the transmission spectrum 200 where the transmission peaks, for example, have a center-to-center spacing of 100 GHz.

From FIG. 2 and the foregoing description, it can be seen that two channels are assigned to each port, where one, for example channel 220-1, of the two channels assigned to each port is an eastbound channel and the other is a westbound channel, for example channel 230-1. It can also be seen from FIG. 2 that a guard band 250 of unused channels is provided between eastbound channels 220 and westbound channels 230.

Thus, Mux/Demux 140 is configured to receive an eastbound optical signal n (where n is an index from 1-40) emitted by a transmitter 122-1 through 122-40 on channel 220-1 through 220-40 (e.g., Ch01A to Ch40A which correspond to 01East to 40East) of communication modules 120-1 through 120-40 on module-side of ports 142-1 through 142-40 and to spatially combine all eastbound optical signals for output at combined port 144 to optical fiber 110 for eastward transmission to combined port 154 of Mux/Demux 150. Mux/Demux 150 receives and spatially separates the eastbound optical signals and outputs each eastbound optical signal on module-side ports 152-1 through 152-40 to be received by communication modules 130-1 through 130-40.

Similarly, Mux/Demux 150 is configured to receive a westbound optical signal emitted by a transmitter 132-1 through 132-40 on channel 230-1 through 230-40 (e.g., Ch01B to Ch40B which correspond to 01West to 40West) of communication modules 130-1 through 130-40 on module-side ports 152-1 through 152-40 and to spatially combine all westbound optical signals for output at combined port 154 to optical fiber 110 for westward transmission to Mux/Demux 140. Mux/Demux 140 receives and spatially separates the westbound optical signals and outputs each westbound optical signal on module-side ports 142-1 through 142-40 to be received by communication modules 120-1 through 120-40.

Each communication module 120/130 in the system 100 may include a single input/output port 124/134 through which an outbound optical signal generated by the transmitter of the communication module 120/130 is output, and also through which an inbound optical signal received from the corresponding Mux/Demux 140/150 may be received. In these and other embodiments, each communication module 120/130 may include a wideband filter 126/136 configured to pass the outbound signal and reflect the inbound signal, or vice versa.

In an example embodiment, each wideband filter 126 in communication modules 120 may have a filter response 260. The filter response 260 is designed to be aligned to the transmission spectrum of the channel plan 200 of each Mux/Demux 140/150 in FIG. 1. Further, each wideband filter 136 in communication modules 130 may have a filter response 270. The filter response 270 is also designed to be aligned to the transmission spectrum of the channel plan 200 of each Mux/Demux 140/150 in FIG. 1.

As illustrated by the channel plan 200 and filter response 260, each wideband filter 126 in communication modules 120 may include a lowpass filter configured to pass all the eastbound signals on eastbound channels 220-1 through 220-40 (e.g., 01East to 40East) and to reflect all the westbound channels on westbound channels 230-1 through 230-40 (e.g., 01West to 40West). For instance, wideband filter 126-1 in communication module 120-1 may be configured to pass the optical signal emitted by the transmitter 122-1 (TX Ch01A) on eastbound channel 220-1 (01East) so that it may be input to Mux/Demux 140 through the module-side port 142-1 and to reflect the optical signal received from Mux/Demux 140 through the module-side port 142-1 on westbound channel 230-1 (01West) to be received by receiver 128-1 (RX Ch01B).

As further illustrated by the channel plan 200 and filter response 270, each wideband filter 136 in communication modules 130 may include a highpass filter configured to pass all the westbound signals on westbound channels 230-1 through 230-40 (e.g., 01West to 40West) and to reflect all eastbound channels on eastbound channels 220-1 through 220-40 (e.g., 01East to 40East). For instance, wideband filter 136-1 in communication module 130-1 may be designed to pass the optical signal emitted by transmitter 132-1 (TX Ch01B) on westbound channel 230-1 (01West) to input to Mux/Demux 150 through the module-side port 152-1 and to reflect the optical signal received from Mux/Demux 150 through the module-side port 152-1 on eastbound channel 220-1 (01East) to be received by receiver 138-1 (RX Ch01A).

In FIG. 2, the eastbound channels 220 may include forty channels with 100 GHz spacing in the ITU-T C-band (e.g., 1530-1565 nanometers (nm)). Additionally, the westbound channels 230 may include forty channels with 100 GHz spacing in the ITU-T L-band (e.g., 1568-1610 nm). Further, the guard band 250 occupies not an insignificant portion of the channel plan 200. The width of guard band 250 is based at least in part on the slope 262/272 of the filter responses. For more relaxed slopes 262/272 of the filter responses, the guard band 250 becomes wider. Slopes 262/272 of the filter responses may be shortened by using more complex filters 126/136, however, shortened filter response filters 126/136 require tightened filter specifications and, therefore, more filter components and a more complex filter design resulting in increased size and expense.

Figure 3:
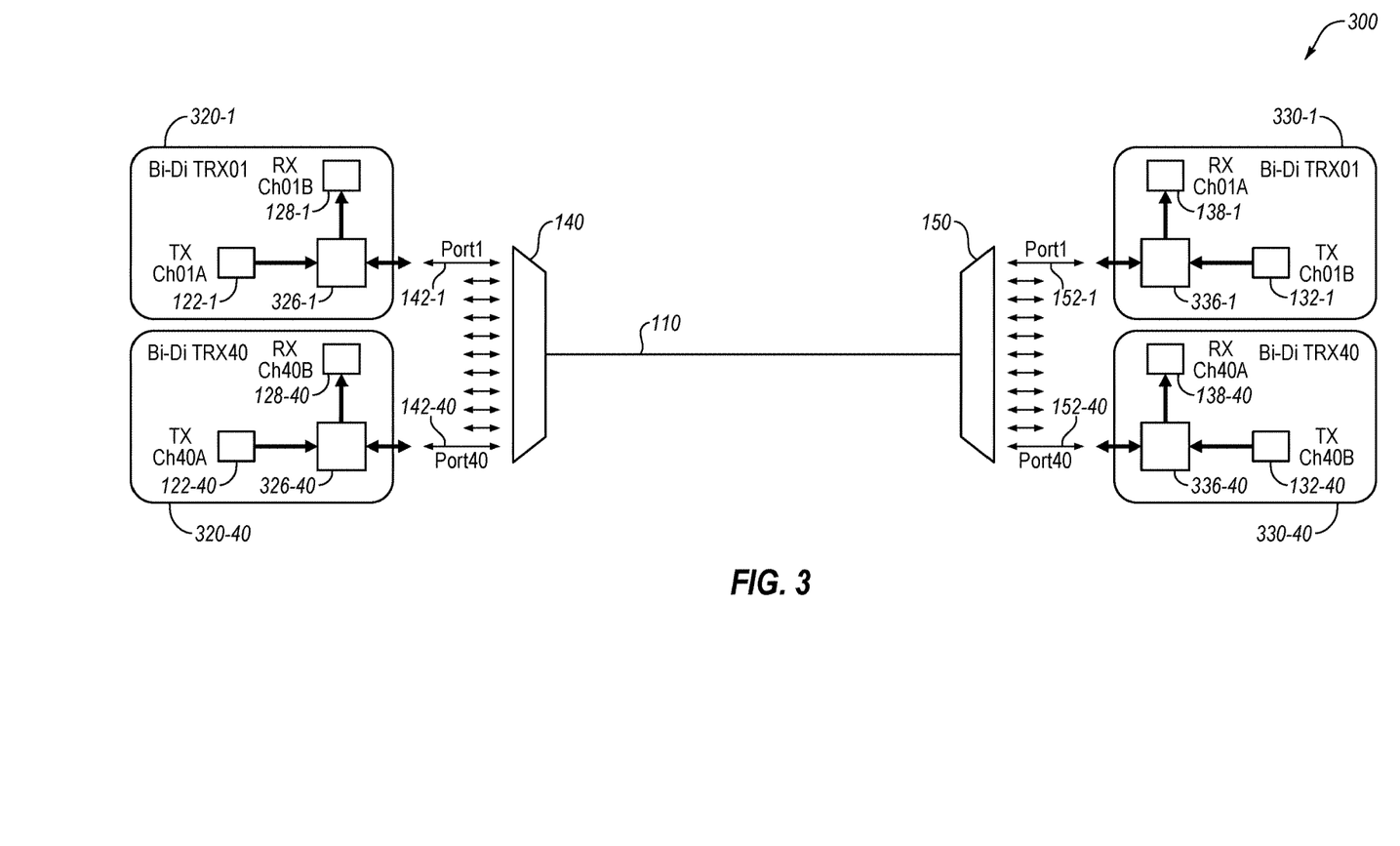
FIG. 3 illustrates another example optical communication configured as a bidirectional (bi-di) dense wavelength division multiplexing (DWDM) system.

FIG. 3 illustrates another example optical communication system configured as a bidirectional (bi-di) dense wavelength division multiplexing (DWDM) system 300 (hereinafter "system 300"), arranged in accordance with at least one embodiment described herein. Similar to the system 100, the system 300 may include a left and right 100 GHz Mux/Demux 140/150 communicatively coupled by an optical fiber 110, with forty left communication modules 320-1 through 320-40 and forty right communication modules 330-1 through 330-40. Each 100 GHz Mux/Demux 140/150 in FIG. 3 may be the same as in FIG. 1.

In the system 100 of FIG. 1, each of the eighty total communication modules 120/130 includes a common fixed-response wideband filter 126/136 to pass a corresponding outbound optical signal emitted by a corresponding transmitter and reflect a corresponding inbound optical signal toward a corresponding receiver. In comparison, in the system 300 of FIG. 3, each communication module 320/330 may include a tunable filter 326/336 to pass a corresponding outbound optical signal emitted by a corresponding transmitter 122/132 and reflect a corresponding inbound optical signal toward a corresponding receiver 128/138. The configuration of FIG. 3 may accommodate a higher channel density by allowing the guard band to be tunable or adjustable for each port or groups of ports in system 300. As used herein, "tunable filter" may include a filter that is adjustable based on a control signal such as a programmable control signal described with respect to the embodiment of FIG. 6 or may include a filter that is configurable to a single band (i.e., fixed) either by a fixed programmable control signal as described with respect to the embodiment of FIG. 6 or by a fixed signal such as by an electric circuit or electrical component.

Figure 4:
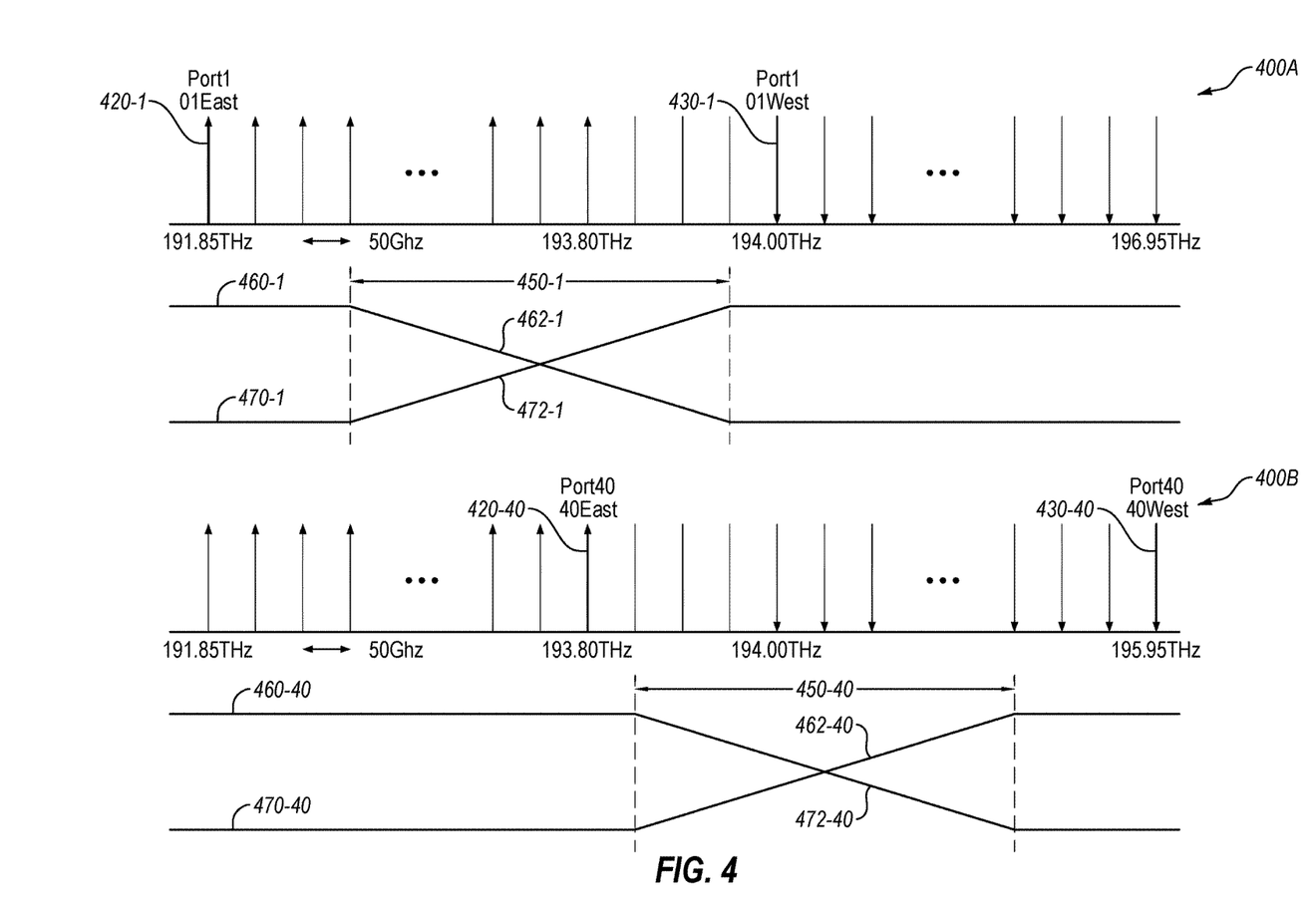
FIG. 4 illustrates a channel plan of a bidirectional (bi-di) dense wavelength division multiplexing (DWDM) system.

FIG. 4 illustrates one embodiment of a channel plan for system 300. In more detail, FIG. 4 additionally includes the channel plan 400 of each Mux/Demux 140/150 along with port and channel assignments in the system 300. Similar to FIG. 1, in FIG. 3, each eastbound channel is assigned to a different port of each Mux/Demux 140/150 and different transmission peak of the channel plan 400 than other eastbound channels, while each westbound channel is assigned to a different port of each Mux/Demux 140/150 and different transmission peak of the channel plan 400 than other westbound channels. However, in FIG. 3, the guard band 450 for each east/west pair is adjustable due to tunable filter 326/336. Alternatively, the guard band 450 for groups of east/west pairs may also be adjustable due to tunable filters 326/336.

In one example embodiment, each wideband filter 326 in communication modules 320 may have a filter response 460. The filter response 460 is designed to be adjustable to the channel plan 400 of each Mux/Demux 140/150 in FIG. 3. Further, each wideband filter 336 in communication modules 330 may have a filter response 470. The filter response 470 is also designed to be adjustable to the channel plan 400 of each Mux/Demux 140/150 in FIG. 3.

As illustrated by the channel plan 400 and filter response 460, each wideband filter 326 in communication modules 320 may include a tunable lowpass filter configured to pass all the eastbound signals on eastbound channels 420-1 through 420-40 (e.g., 01East to 40East) and to reflect all the westbound channels on westbound channels 430-1 through 430-40 (e.g., 01West to 40West). For instance, tunable filter 326-1 in communication module 320-1 may be configured to pass the optical signal emitted by the transmitter 122-1 (TX Ch01A) on eastbound channel 420-1 (01East) so that it may be input to Mux/Demux 140 through the module-side port 142-1 and to reflect the optical signal received from Mux/Demux 140 through the module-side port 142-1 on westbound channel 430-1 (01West) to be received by receiver 128-1 (RX Ch01B).

As further illustrated by the channel plan 400 and filter response 470, each tunable filter 336 in communication modules 330 may include a tunable highpass filter configured to pass all the westbound signals on westbound channels 430-1 through 430-40 (e.g., 01West to 40West) and to reflect all eastbound channels on eastbound channels 420-1 through 420-40 (e.g., 01East to 40East). For instance, tunable filter 336-1 in communication module 330-1 may be designed to pass the optical signal emitted by transmitter 132-1 (TX Ch01B) on westbound channel 430-1 (01West) to input to Mux/Demux 150 through the module-side port 152-1 and to reflect the optical signal received from Mux/Demux 150 through the module-side port 152-1 on eastbound channel 420-1 (01East) to be received by receiver 138-1 (RX Ch01A).

In FIG. 4, the eastbound channels 420 may include forty channels with 50 GHz spacing in, for example, the ITU-T C-band. Additionally, the westbound channels 430 may include forty channels with 50 GHz spacing in the ITU-T C-band. Further, the width of guard band 450 is based at least in part on the slopes 462/472 of the filter responses. Yet further, the location in channel plan 400 of guard band 450 is adjustable or tunable, in the present embodiment, for each pair of channels 420/430. Specifically, the tunable filter 326/336 for each communication module 320/330 may be individually incrementally tuned along channel plan 400 to provide a guard band 450-1 through 450-40 where each guard band 450 may be incrementally individually positioned along channel plan 400. The tunable filter 326/336 may be incrementally tuned by controller 610 as illustrated below with respect to FIG. 6 or tunable filter 326/336 may be incrementally tuned by differently configured fixed filters as illustrated below with respect to FIG. 7.

Channel plan 400A illustrates a first pair of channels 420-1/430-1 traversing over port 1 of system 300. Guard band 450-1 may be skewed away from the channel 430-1 to accommodate relaxed slopes 462-1/472-1 of the filter responses. Similarly, channel plan 400B illustrates a fortieth pair of channels 420-40/430-40 traversing over port 40 of system 300. Guard band 450-40 may be skewed away from the channel 420-40 to accommodate relaxed slopes 462-40/472-40 of the filter responses.

In the embodiment of FIG. 3, the slopes 462/472 of the filter responses may be relaxed or lengthened because the guard band for each channel pair on each port may be nearly as wide as the band spacing between the pair of channels. By relaxing or lengthening the guard band 450, less expensive, physically smaller, and more reliable tunable filters 326/336 may be used. Further, the adjustability of guard band 450 due to tunable filters 326/336, allows the reuse of some or all of the channels occurring in guard band 250 of FIG. 2.

Figure 5:
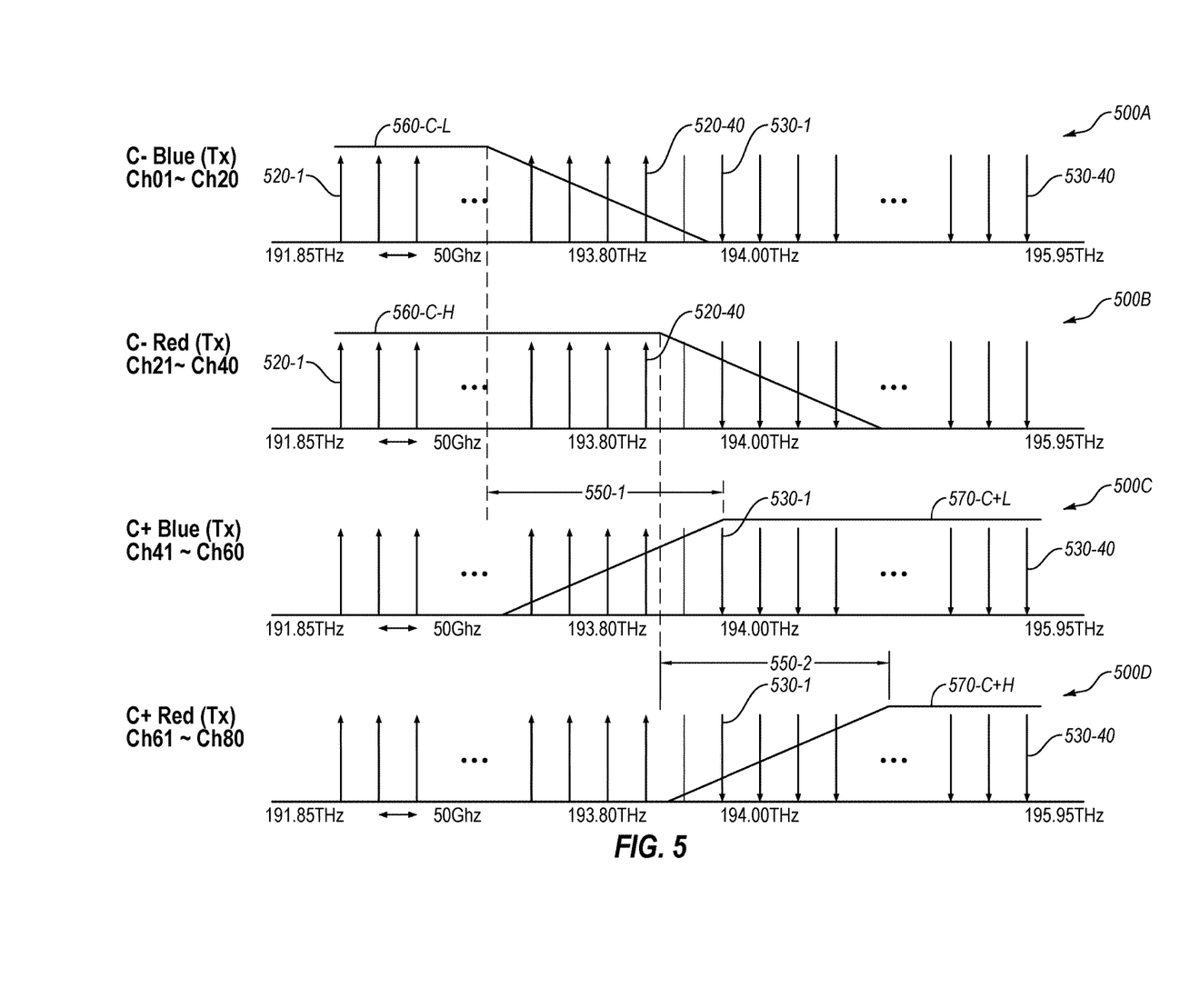
FIG. 5 illustrates a channel plan of a bidirectional (bi-di) dense wavelength division multiplexing (DWDM) system.

FIG. 5 illustrates another embodiment of a channel plan for system 300. In FIG. 4, the channel plan 400 illustrates bandwidth 450 having group-wise tunable filters 326/336 resulting in guard band 450 for each group of ports being group-wise offset from the guard band of a neighboring group of ports. While fine granularity in tuning the guard band may be desirable as illustrated in the embodiment of FIG. 4, such fine tunable granularity could require eighty (forty for eastbound transmit signals and 40 for westbound transmit signals) differently configured communications modules 320/330. While flexibility in tuning the guard band may be desirable, such tuning capability will require additional control circuitry (as in the tunable filter embodiment of FIG. 6) or a large quantity of uniquely fixed value tunable filters (as in the tunable filter embodiment of FIG. 7).

In the embodiment of FIG. 5, a fewer quantity of differently configured communication modules 320/330 are disclosed. Specifically, tunable filters 326/336 may be configured to provide a common frequency response for a group of pairs of channels. It is noted that "tunable filter" as used herein may also include filters that are fixed in value, either by a control signal as in FIG. 6 described below, or through the use of an electric circuit as in FIG. 7 also described below. Further, the groups of tunable filters 326/336 may be tuned by controller 610 as illustrated below with respect to FIG. 6 or tunable filter 326/336 may be incrementally tuned by differently configured fixed filters as illustrated below with respect to FIG. 7.

Accordingly, the tunable filter 326/336 for each communication module 320/330 may be step-wise tuned. For example, a plurality of channels 560/570 may be tuned using one of four (two for eastbound transmit signals and two for westbound transmit signals) different step-wise fixed filter values for groups of channels along channel plan 500 to provide step-wise guard bands 550-1 through 550-2 where each guard band 550 may be flexibly step-wise positioned along channel plan 500. For example, a first group of eastbound transmit channels 520-1 through 520-20 may have a first common fixed filter value for tunable filters 326-1 through 326-20. A second group of pairs of eastbound transmit channels 560-21 through 560-40 may have a second common fixed filter value for tunable filters 326-21 through 326-40. Further, a third group of westbound transmit channels 570-1 through 570-20 may have a third common fixed filter value for tunable filters 336-1 through 336-20. Finally, a fourth group of westbound transmit channels 570-21 through 570-40 may have a fourth common fixed filter value for tunable filters 336-21 through 336-40.

For example in the present embodiment, each of communication modules 320 may be configured between two different values for each of tunable filters 326. Channel plan 500A illustrates, for example, a first filter response 560-C–L for tunable filters 326-1 through 326-20 (not separately illustrated) corresponding to eastbound transmit channels 1 through 20 and respectively coupled to ports 1 through 20 coupled to communication modules 320-1 through 320-20. Channel plan 500B illustrates, for example, a second filter response 560-C–H for tunable filters 326-21 (not separately illustrated) through 326-40 corresponding to eastbound transmit channels 21 through 40 and respectively coupled to ports 21 through 40 coupled to communication modules 320-21 through 320-40. Similarly, channel plan 500C illustrates, for example, a third filter response 570-C+L for tunable filters 336-1 through 336-20 (not separately illustrated) corresponding to westbound transmit channels 1 through 20 and respectively coupled to ports 1 through 20 coupled to communication modules 330-1 through 330-20. Channel plan 500D illustrates, for example, a fourth filter response 570-C+H for tunable filters 336-21 (not separately illustrated) through 336-40 corresponding to westbound transmit channels 21 through 40 and respectively coupled to ports 21 through 40 coupled to communication modules 330-21 through 330-40. The forty channels correspond to the forty channel pairs described above.

The embodiment of FIG. 5, illustrates four separate filters, two for eastbound transmit channels and two for westbound transmit channels. Such an arrangement allows for a smaller quantity (e.g., four) of differently configured communication modules 320/330. It should be noted that the quantity of four differently grouped filter responses is only illustrative and other numbers of different grouped filters responses, including a lesser and greater quantity are also contemplated.

Figure 6:
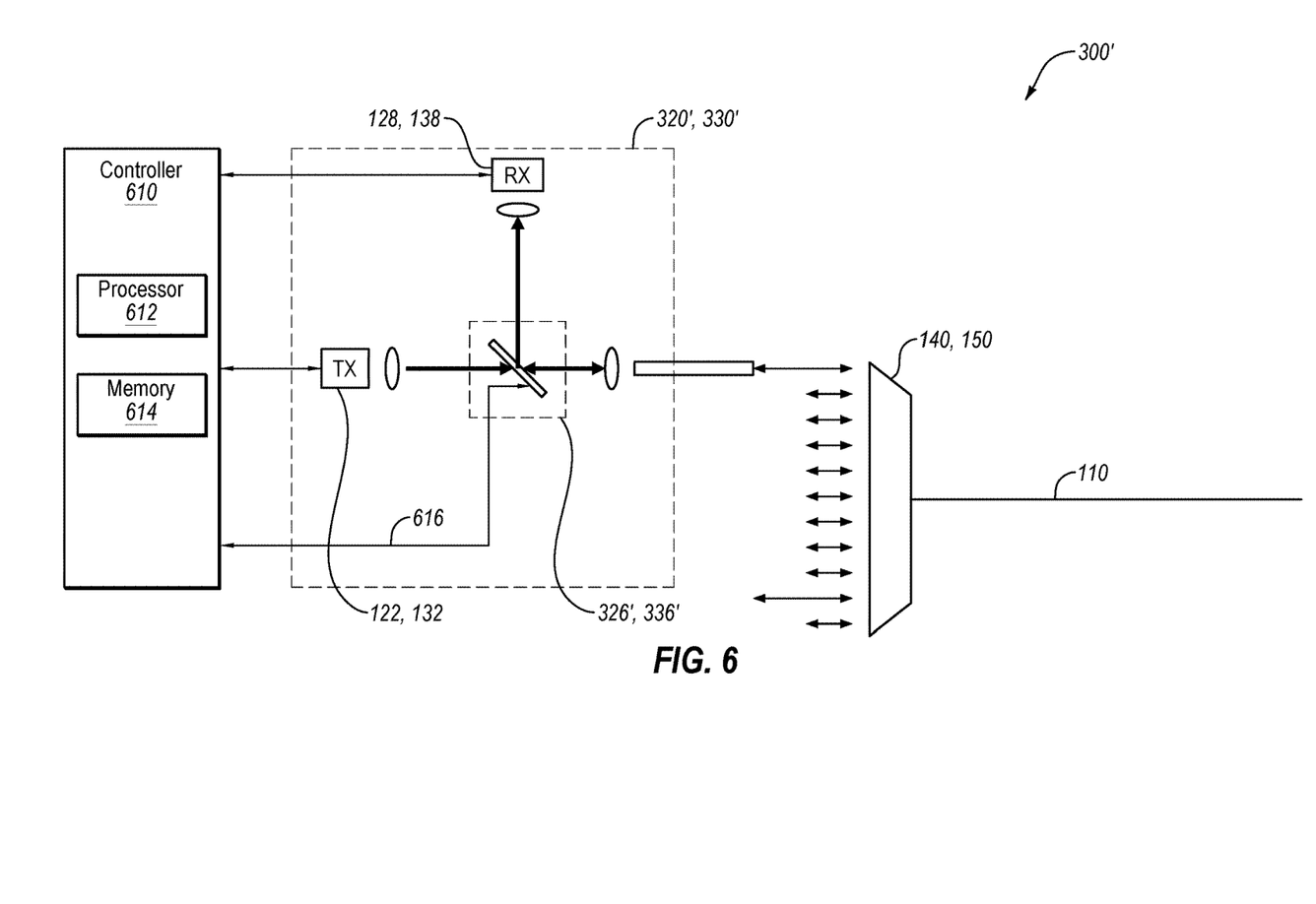
FIG. 6 illustrates a transceiver with tunable filter and programmable control.

FIG. 6 illustrates a transceiver 300' with tunable filter and programmable control, arranged in accordance with the various embodiments described herein. Transceiver 320', 330' may include receiver 128, 138 and transmitter 122, 132 as described above. Transceiver 320', 330' may further include a tunable filter 326', 336' which may be tunable (i.e., configurable) by way of a control signal 616. Tunable filter 326', 336' may be implemented in a communication module 320', 330' with a controller 610 configured according to a processor 612 and memory 614 to tune each of tunable filters 326', 336' according to one of the embodiments of FIG. 4 (i.e., where each channel pair is uniquely configured) or FIG. 5 (i.e., where a plurality of channel pairs are group-wise similarly configured). Further, controller 610 may be configured as active or passive circuitry to provide a fixedly tuned tunable filter 326', 336'.

Tunable filter 326', 336' in communication module 320', 330' may be configured according to one of channel plan 400 or channel plan 500.

Figure 7:
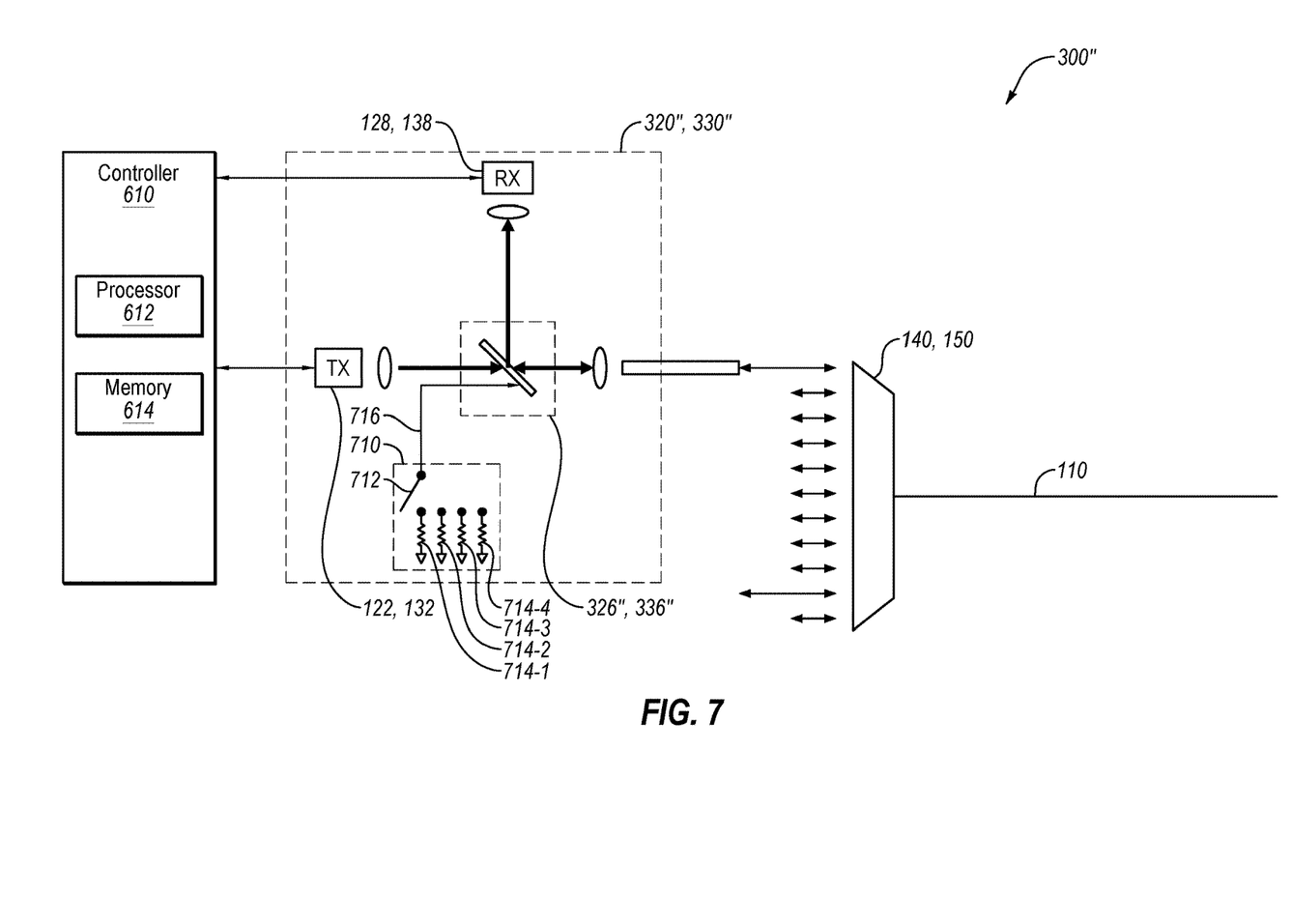
FIG. 7 illustrates a transceiver with a tunable filter with fixed control.

FIG. 7 illustrates a transceiver 300" with tunable filter and fixed control, arranged in accordance with the various embodiments described herein. Transceiver 320", 330" may include receiver 128, 138 and transmitter 122, 132 as described above. Transceiver 320", 330" may further include a tunable filter 326", 336" which may be tunable (i.e., configurable) by way of a fixed signal 716 such as an electric circuit or electrical component. Tunable filter 326", 336" may be implemented in a communication module 320", 330" with an electrical circuit 710 configured, in one example, according to a jumper or switch 712 and one or more resistors 714. While the electrical circuit 710 is illustrated as containing multiple circuit elements, a single element such as a resistor or capacitor is also contemplated.

Electrical circuit 710 illustrates a plurality of resistors 714-1, 714-2, 714-3, and 714-4 which may be separately selected to differently configure the tunable filter 326", 336" according to one of the embodiments of FIG. 4 (i.e., where each channel pair is uniquely configured) or FIG. 5 (i.e., where a plurality of channel pairs are group-wise similarly configured).

Tunable filter 326,336 in communication module 320", 330" may be configured according to one of channel plan 400 or channel plan 500.

In yet a further embodiment illustrated with respect to FIG. 5 and FIG. 7, the transceiver 300" may include transceiver 320", 330" which respectively include receiver 128, 138 and transmitter 122, 132 as described above. Transceiver 320", 330" may further include a tunable filter 326", 336" which may be fixed to two or more fixed filter values. Tunable filter 326", 336" may be implemented in a communication module 320", 330" with an electrical circuit 710 configured, in another example, according to a fixed connection (e.g., jumper 712 may be configured as a conductive trace rather than as a "switch") and one or more resistors 714. In such a fixed tunable filter configuration, a control signal is not necessary since the values of the tunable filters 326", 336" are fixed. While the electrical circuit 710 is illustrated as containing multiple circuit elements, a single element such as a resistor or capacitor is also contemplated.

In the further embodiment, the electrical circuit 710 may include only a single resistor 714 which may be fixed to configure the tunable filter 326", 336" according to a specific frequency response. For example and with respect to the channel plan 500 of FIG. 5, the transceiver 300" may include a first fixed lower frequency tunable filter 326" for communication modules 320" coupled to channels Ch01-Ch20. Further, the transceiver 300" may include a second fixed higher frequency tunable filter 326" for communication modules 320" coupled to channels Ch21-Ch40. Further, the transceiver 300" may include a third fixed lower frequency tunable filter 336" for communication modules 330" coupled to channels Ch41-Ch60. Yet further, the transceiver 300" may include a fourth fixed higher frequency tunable filter 336" for communication modules 330" coupled to channels Ch61-Ch80. In the present embodiment, the transceiver 300" may be configured with only four different tunable filter values that are fixed to one of four different frequency responses. Accordingly, the tunable filters in the present embodiment may be fixed to one or four different values depending on the channels of the channel plan. While the present embodiment has been described with respect to four different fixed filter values for the tunable filters 326", 336" of transceiver 300", a greater number of fixed filter values is also contemplated.

Figure 8:
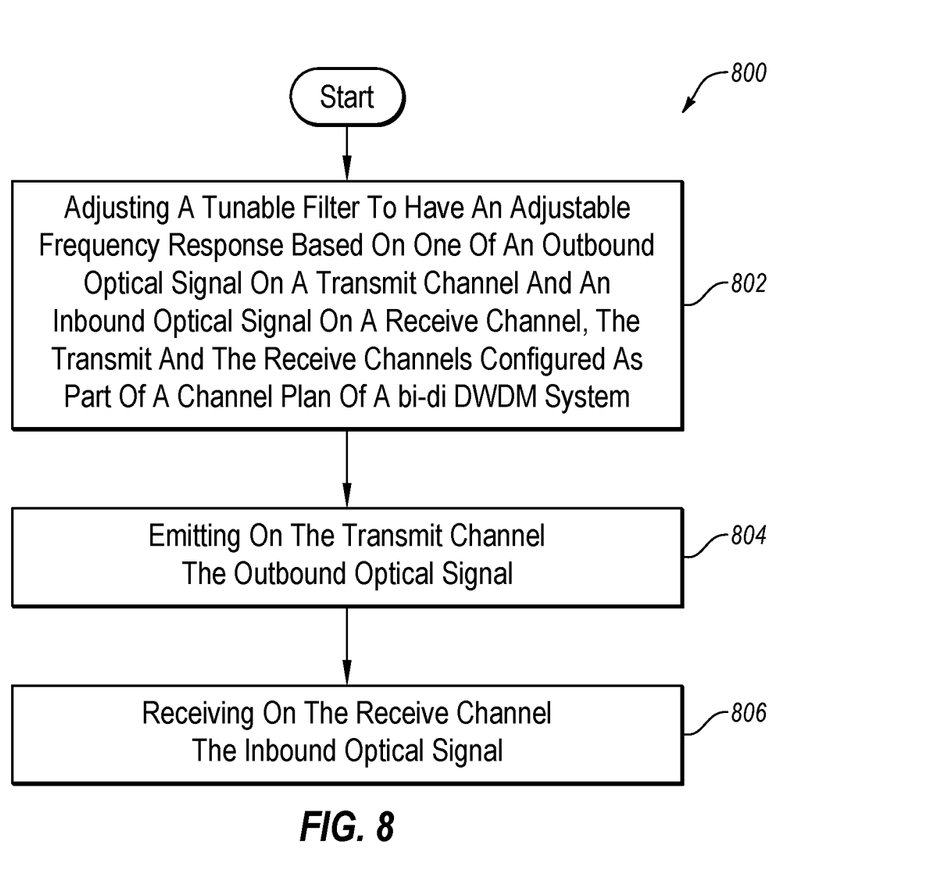
FIG. 8 is a flowchart of a method for adjusting a tunable filter to have an adjustable frequency response as part of a channel plan of a bidirectional (bi-di) dense wavelength division multiplexing (DWDM) system.

FIG. 8 is a flowchart of a method 800 for adjusting a tunable filter to have an adjustable frequency response as part of a channel plan of a bidirectional (bi-di) dense wavelength division multiplexing (DWDM) system.

At block 802, the tunable filter is adjusted to have an adjustable frequency response based on one of an outbound optical signal on a transmit channel and an inbound optical signal on a receive channel. The tunable filter is in an optical path of the outbound optical signal and in an optical path of the inbound optical signal. The transmit and the receive channels are configured as part of a channel plan of a bidirectional (bi-di) dense wavelength division multiplexing (DWDM) system.

At block 804, the outbound optical signal is emitted on the transmit channel.

At block 806, the inbound optical signal is received on the receive channel.

The embodiments described herein include a tunable filter that is transmissive to an outbound optical signal emitted by a transmitter and that reflects an inbound optical signal toward a receiver. In other embodiments, the tunable filter may be transmissive to the inbound optical signal and may reflect the outbound optical signal, in which case the positions of the transmitter and the receiver may be switched as compared to the embodiments illustrated in the figures.

All examples and conditional language recited herein are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

The invention claimed is:

1. A communication module comprising:
   an optical transmitter configured to emit an outbound optical signal on a transmit channel;
   an optical receiver configured to receive an inbound optical signal on a receive channel; and
   a tunable filter in an optical path of the outbound optical signal and in an optical path of the inbound optical signal, the tunable filter configured for operation in an optical frequencies channel plan of a bidirectional (bi-di) dense wavelength division multiplexing (DWDM) system including at least first transmit and receive channels with a first guard band at a first frequency location therebetween and second transmit and receive channels with a different second guard band at a second frequency location therebetween, the tunable filter having an adjustable frequency response based on one of the first frequency location of the first guard band or the second frequency location of the different second guard band, the communication module configured to operate according to the optical frequencies channel plan including concurrent operation of the first transmit and receive channels having the first guard band therebetween and the second transmit and receive channels having the different second guard band therebetween.

2. The communication module of claim 1, wherein the adjustable frequency response includes a slope at least partially transitioning outside any guard band in the channel plan.

3. The communication module of claim 2, wherein the slope of the adjustable frequency response transitions across at least another transmit or receive channel in the channel plan.

4. The communication module of claim 1, wherein the channel plan includes the transmit channel and the receive channel without any guard band therebetween.

5. The communication module of claim 1, wherein the tunable filter is adjusted to the adjustable frequency response based on a location of at least one of the transmit or the receive channel in the channel plan.

6. The communication module of claim 5, wherein the adjustable frequency response for the transmit and the receive channels is differently configured from any other transmit or receive channels in the channel plan.

7. The communication module of claim 5, wherein the adjustable frequency response for the transmit and the receive channels is similarly configured with at least one other transmit or receive channel and differently configured from at least another one of transmit or receive channel in the channel plan.

8. A method, comprising:
   adjusting a tunable filter in a communication module to have an adjustable frequency response based on one of an outbound optical signal on a transmit channel and an inbound optical signal on a receive channel, the tunable filter in an optical path of the outbound optical signal and in an optical path of the inbound optical signal, the tunable filter configured for operation in an optical frequencies channel plan of a bidirectional (bi-di) dense wavelength division multiplexing (DWDM) system including at least first transmit and receive channels with a first guard band at a first frequency location therebetween and second transmit and receive channels with a different second guard band at a second frequency location therebetween, the adjustable frequency response based on one of the first frequency location of the first guard band or the second frequency location of the different second guard band, the communication module configured to operate according to the optical frequencies channel plan including concurrent operation of the first transmit and receive channels having the first guard band therebetween and the second transmit and receive channels having the different second guard band therebetween;
   emitting the outbound optical signal on the transmit channel; and
   receiving the inbound optical signal on the receive channel.

9. The method of claim 8, wherein the adjustable frequency response includes a slope at least partially transitioning outside any guard band in the channel plan.

10. The method of claim 9, wherein the slope of the adjustable frequency response transitions across at least another transmit or receive channel in the channel plan.

11. The method of claim 8, wherein the channel plan includes the transmit channel and the receive channel without any guard band therebetween.

12. The method of claim 8, wherein the tunable filter is adjusted to the adjustable frequency response based on a location of at least one of the transmit channel or the receive channel in the channel plan.

13. The method of claim 12, wherein the adjustable frequency response for the transmit and the receive channels is differently configured from any other transmit or receive channels in the channel plan.

14. The method of claim 12, wherein the adjustable frequency response for the transmit and the receive channels is similarly configured with at least one other transmit or receive channel and differently configured from at least another one of transmit or receive channel in the channel plan.

15. A system comprising:
a communication module comprising:
an optical transmitter configured to emit an outbound optical signal on a transmit channel;
an optical receiver configured to receive an inbound optical signal on a receive channel; and
a tunable filter in an optical path of the outbound optical signal and in an optical path of the inbound optical signal, the tunable filter configured for operation in an optical frequencies channel plan of a bidirectional (bi-di) dense wavelength division multiplexing (DWDM) system including at least first transmit and receive channels with a first guard band at a first frequency location therebetween and second transmit and receive channels with a different second guard band at a second frequency location therebetween, the tunable filter having an adjustable frequency response based on one of the first frequency location of the first guard band or the second frequency location of the different second guard band, the communication module configured to operate according to the optical frequencies channel plan including concurrent operation of the first transmit and receive channels having the first guard band therebetween and the second transmit and receive channels having the different second guard band therebetween; and
a controller coupled to the tunable filter to configure the tunable filter to the adjustable frequency response.

16. The system of claim 15, wherein the adjustable frequency response includes a slope at least partially transitioning outside any guard band in the channel plan.

17. The system of claim 16, wherein the slope of the adjustable frequency response transitions across at least another transmit or receive channel in the channel plan.

18. The system of claim 15, wherein the channel plan includes the transmit channel and the receive channel without any guard band therebetween.

19. The system of claim 15, wherein the tunable filter is adjusted to the adjustable frequency response based on a location of at least one of the transmit channel or the receive channel in the channel plan.

20. The system of claim 19, wherein the adjustable frequency response for the transmit and the receive channels is differently configured from any other transmit or receive channels in the channel plan.

* * * * *